US012116917B2

(12) United States Patent
Brenner

(10) Patent No.: US 12,116,917 B2
(45) Date of Patent: Oct. 15, 2024

(54) CONNECTION UNIT

(71) Applicant: Purem GmbH, Neunkirchen (DE)

(72) Inventor: Holger Brenner, Stuttgart (DE)

(73) Assignee: Purem GmbH, Neunkirchen (DE)

( * ) Notice: Subject to any disclaimer, the term of this patent is extended or adjusted under 35 U.S.C. 154(b) by 0 days.

(21) Appl. No.: 18/327,678

(22) Filed: Jun. 1, 2023

(65) Prior Publication Data

US 2023/0392530 A1 Dec. 7, 2023

(30) Foreign Application Priority Data

Jun. 2, 2022 (DE) ..................... 10 2022 113 905.0

(51) Int. Cl.
*F01N 3/20* (2006.01)
*F01N 13/18* (2010.01)
*H01R 4/30* (2006.01)

(52) U.S. Cl.
CPC ........... *F01N 3/2013* (2013.01); *H01R 4/302* (2013.01); *F01N 13/1838* (2013.01)

(58) Field of Classification Search
CPC ............... F01N 3/2013; F01N 13/1838; F01N 2240/16; F01N 2260/20; F01N 2450/16; F01N 2450/22; F01N 2450/24; F01N 13/1827; F01N 3/027; H01R 4/302
See application file for complete search history.

(56) References Cited

U.S. PATENT DOCUMENTS 5,456,890 A 10/1995 Tsai et al.
5,614,155 A * 3/1997 Abe ...................... F01N 3/2842 422/177
5,670,746 A * 9/1997 Hashimoto ............ H01R 13/73 422/174
6,031,213 A * 2/2000 Hashimoto ........... F01N 3/2026 422/174
6,176,081 B1 1/2001 Shimasaki et al.
2009/0324361 A1* 12/2009 Dolan ................... F16B 5/0258 411/55
2018/0272859 A1* 9/2018 Barbano ............... F24H 9/1872
2020/0406190 A1 12/2020 Aufranc et al.
2022/0186647 A1 6/2022 Saurat et al.

FOREIGN PATENT DOCUMENTS

| | | |
|---|---|---|
| DE | 693 04 746 T2 | 4/1997 |
| DE | 10 2020 116 831 A1 | 12/2020 |
| DE | 20 2021 102 620 U1 | 7/2021 |
| EP | 0 687 807 A1 | 12/1995 |
| EP | 0 902 991 B1 | 9/2000 |
| WO | 2021/203152 A1 | 10/2021 |

* cited by examiner

*Primary Examiner* — Brandon D Lee
(74) *Attorney, Agent, or Firm* — Walter Ottesen, P.A.

(57) ABSTRACT

A connection unit connects an electrical supply line to an exhaust-gas heater of an exhaust system. The connection unit includes a connection element having an electrically conductive connection-element body. The connection element has an exhaust-gas heater connection region in a first axial end region and has a supply-line connection region in a second axial end region. The supply-line connection region includes an end portion of the connection-element body and a radial projection adjoining the end portion. A carrier element fixes the connection unit to an exhaust-system component. The carrier element has a carrier-element opening wherethrough the connection-element body passes. A support unit axially and radially supports the connection element on the carrier element.

19 Claims, 3 Drawing Sheets

CONNECTION UNIT

CROSS-REFERENCE TO RELATED APPLICATIONS

This application claims priority of German patent application no. 10 2022 113 905.0, filed Jun. 2, 2022, the entire content of which is incorporated herein by reference.

TECHNICAL FIELD

The present disclosure relates to a connection unit for connecting an electrical supply line to an exhaust-gas heater of an exhaust system of an internal combustion engine.

BACKGROUND

In order to supply heat to the exhaust gas flowing in an exhaust system of an internal combustion engine, for the purpose of more rapid heating of an exhaust-gas treatment unit arranged in the exhaust system, for example a catalytic converter or particulate filter, in particular in a start-up phase of the working operation of an internal combustion engine, and thus to bring the exhaust-gas treatment unit more rapidly up to operating temperature, it is known to use exhaust-gas heaters that generate heat by electrical excitation. The heat can be taken up by the exhaust gas flowing through such an exhaust-gas heater and carried to a downstream exhaust-gas treatment unit. For the electrical excitation of such exhaust-gas heaters, it is necessary for the voltage provided in a vehicle electrical system to be applied to a heating region of the exhaust-gas heater, via connection units, in an electrically insulated manner through an exhaust-system component that includes an exhaust-gas heater and carries the exhaust gas.

It is an object of the disclosure to provide a connection unit, for connecting an electrical supply line to an exhaust-gas heater of an exhaust system of an internal combustion engine, that, with a simple structure that is resistant to thermal overload, is configured to receive large electrical currents.

The above object is, for example, achieved, according to the disclosure, by a connection unit for connecting an electrical supply line to an exhaust-gas heater of an exhaust system of an internal combustion engine. The connection unit includes:

a connection element having an electrically conductive connection-element body that is elongate in the direction of a longitudinal axis, the connection element having an exhaust-gas heater connection region in a first axial end region and having a supply-line connection region in a second axial end region, the supply-line connection region including an end portion of the connection-element body and a radial projection of the connection-element body adjoining the end portion, a carrier element for fixing the connection unit to an exhaust-system component, the carrier element having a carrier-element opening through which the connection-element body passes at a radial distance from the carrier element, a support unit for axially and radially supporting the connection element on the carrier element, the support unit including a first support element of electrically insulating material supported on the carrier element in a first axial direction and radially outwardly and supported with respect to the radial projection in a second axial direction that is opposite to the first axial direction, and a second support element of electrically insulating material supported on the carrier element in the second axial direction and radially outwardly.

In the case of the connection unit constructed according to the disclosure, the radial projection provided on the connection-element body may be used, in a dual function, both as a counter-bearing for supporting of the connection element in a gas-tight and electrically insulated manner with respect to the carrier element, and in the supply-line connection region as a counter-bearing for a supply line to be connected to the connection unit. This results in a simply configured, yet functionally reliable structure in which it is also easily possible to disconnect the supply line from the connection unit if necessary.

For a particularly simple and stable structure, the radial projection may form an integral constituent part of the connection-element body. This means that the radial projection is realized as a single piece, that is, as one block of material, with the connection-element body and provides the connection element.

In order to avoid the formation of regions on the connection-element body that are subject to high thermal and/or mechanical stresses, it is proposed that the connection-element body be substantially cylindrical. The connection-element body can thus be realized with a substantially constant and large diameter over its entire length. Only in the region of the radial projection is there a variation in the radial dimension.

In order to ensure a defined positioning of the connection element when a supply line is being attached, it is proposed that there be a tool engagement formation realized in an outer circumferential region of the radial projection. For example, the tool engagement formation may include two mutually substantially parallel outer-circumference surface portions of an outer circumferential surface of the radial projection, such that the connection element can be fixed against rotation by a pair of pliers or a spanner during a process of fitting or removing a supply line.

For the purpose of fixing a supply line to the supply-line connection region, for example via a nut, the end portion may be realized with a substantially cylindrical outer circumferential contour or/and there may be an external thread realized on the end portion.

For a defined support interaction of the carrier element with the support elements of the support unit, there may be a first support formation, for axially and radially supporting the first support element, realized on a first axial side of the carrier element, and there may be a second support formation, for axially and radially supporting the second support element, realized on a second axial side of the carrier element.

In order to obtain a defined positioning of the support elements both in the axial direction and in the radial direction, and in particular also to create a gas-tight connection of the support elements to the carrier element, it may be provided in this case that the first support formation includes a first support recess bounded in the first axial direction by a first recess base and bounded radially outwardly by a first recess wall, and/or that the second support formation includes a second support recess bounded in the second axial direction by a second recess base and bounded radially outwardly by a second recess wall.

To enable the carrier element to be fixed to an exhaust-system component, for example by welding, it may be constructed with metal material.

For sufficient electrical insulation even in the case of comparatively large currents via the connection element, it is proposed that the first support element be constructed with ceramic material, or/and that the second support element is constructed with ceramic material.

For a defined radial centering of the connection element with respect to the carrier element, the connection element may pass through a first support-element opening of the first support element substantially without radial movement play or/and pass through a second support-element opening of the second support element substantially without radial movement play.

In order to avoid the occurrence of excessive mechanical stresses during thermal loading, in particular of the connection element, it is proposed that the radial projection be supported in the first axial direction with respect to the first support element via an axially elastic preloading unit.

For example, the preloading unit may include at least one preloading spring, preferably a disk spring.

A local mechanical overloading of the first support element by the preloading unit can be avoided, for example, in that the at least one preloading spring is supported on the first support element, in the first axial direction, via a first disk-type transmission element. This first disk-type transmission element may be constructed, for example, with metal material.

The connection element may be supported on the second support element, in the second axial direction, via a second disk-type transmission element, for example constructed with metal material.

In order to obtain a firm connection, the second transmission element may be fixed to the connection-element body by material bonding, preferably welding.

The disclosure furthermore relates to an exhaust system for an internal combustion engine, including an exhaust-system component that carries an exhaust gas, and at least one exhaust-gas heater arranged in the exhaust-system component and, downstream of the at least one exhaust-gas heater, at least one exhaust-gas treatment unit, at least one connection unit constructed according to the disclosure being fixed to the exhaust-system component in association with the at least one exhaust-gas heater.

BRIEF DESCRIPTION OF DRAWINGS

The invention will now be described with reference to the drawings wherein.

DETAILED DESCRIPTION

Figure 5:
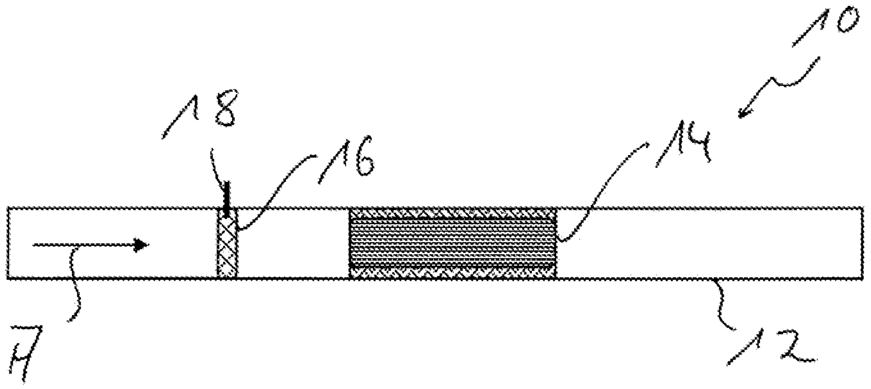
FIG. 5 shows a schematic representation of an exhaust system of an internal combustion engine.

Before the structure of a connection unit for connecting an electrical supply line to an exhaust-gas heater of an exhaust system is described in detail with reference to FIGS. 1 to 4, the basic structure of such an exhaust system of an internal combustion engine, for example on a vehicle, is described with reference to FIG. 5.

The exhaust system 10 includes an exhaust-system component 12, which is configured, for example, in the form of a pipe or housing and in which the exhaust gas A emitted by an internal combustion engine flows. Provided in the exhaust system 12 there is an exhaust-gas treatment unit, denoted in general by 14, which may be realized, for example, as a catalytic converter, for example an oxidation catalytic converter or SCR catalytic converter, particulate filter or the like. Arranged upstream of the exhaust-gas treatment unit 14 there is an exhaust-gas heater 16. The exhaust-gas heater 16 includes a heating region that is constructed, for example, with a heating conductor and through which the exhaust gas A flows. The exhaust gas A thereby takes up heat and transports it to the exhaust-gas treatment unit 14 following downstream. A more rapid heating of the exhaust gas treatment unit 14 can thus be ensured, in particular in operating phases in which the exhaust gas A emitted by the internal combustion engine is still comparatively cold, or the exhaust-gas treatment unit 14 has not yet reached its operating temperature for effecting a catalytic reaction.

In order to apply to the exhaust-gas heater 16 the voltage used to heat the heating region thereof, a connection unit, denoted in general by 18, is used for connection to each pole of a vehicle electrical system. A supply line of the vehicle electrical system may be connected to each connection unit 18 in order to effect the heating of the exhaust gas A, or other gas passed through exhaust-system component 12, by application of a voltage to the exhaust-gas heater 16 and by the current flow generated as a result in exhaust-gas heater 16.

The connection unit 18 represented in detail in FIGS. 1 to 4 includes, as a central constituent part, a connection element 20 realized in the manner of a pin. The connection element 20, constructed with metal material, includes a connection-element body 22 that is elongate in the direction of a longitudinal axis L and having a basically cylindrical structure, which means that the connection-element body 22 has substantially the same radial dimension, or cross-sectional geometry, in all axial regions with respect to the longitudinal axis L.

In a first axial end region 24, which is to be positioned inside the exhaust-system component 12, the connection element 20 has an exhaust-gas heater connection region 26 in which the connection element 20, or the connection-element body 22, is electrically conductively connected, for example via a weld 28, to a heating region 30 of the exhaust-gas heater 16. In a second axial end region 32, which is to be positioned outside of the exhaust-system component 12, the connection element 20 has a supply-line connection region 34 in which it is connected, or can be connected, in the manner described below, to a supply line that is denoted in general by 36.

The supply-line connection region 34 includes an end portion 38 of the connection-element body 22, as well as a radial projection 40 adjoining the end portion 38 and preferably extending fully around the longitudinal axis L. The radial projection 40, which is integral with the connection-element body 22, that is, is in the form of a block of material, provides a planar bearing surface 42, substantially orthogonal to the longitudinal axis L, for the supply line 36, or a cable lug 44 or the like provided thereon.

An external thread 46 is provided on the end portion 38 of the connection-element body 22, such that a nut 48 can be screwed onto this end portion 38 in order to firmly anchor the supply line 36, for example the cable lug 44, to the supply-line connection region 34 of the connection element 20.

Figure 1:
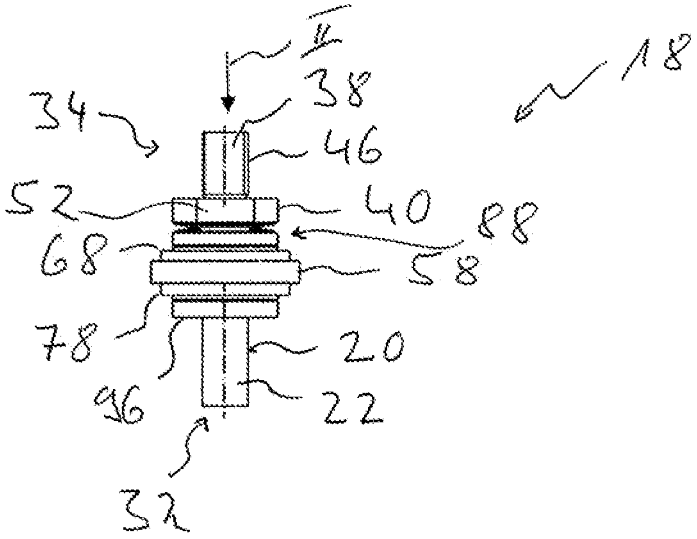
FIG. 1 shows a side view of a connection unit for connecting an electrical supply line to an exhaust-gas heater of an exhaust system.
Figure 2:
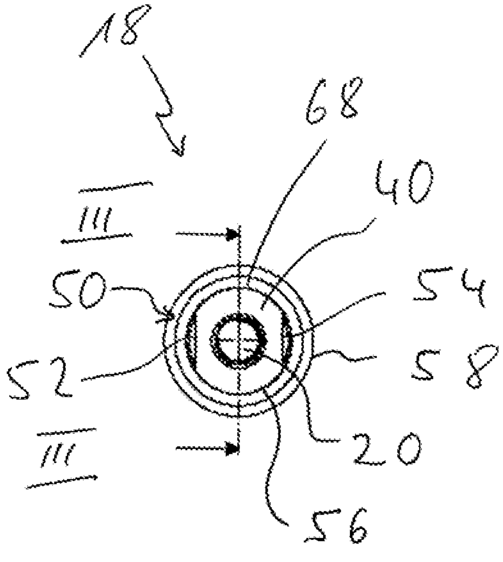
FIG. 2 shows an axial view of the connection unit of FIG. 1, in the direction of view II in FIG. 1.
Figure 3:
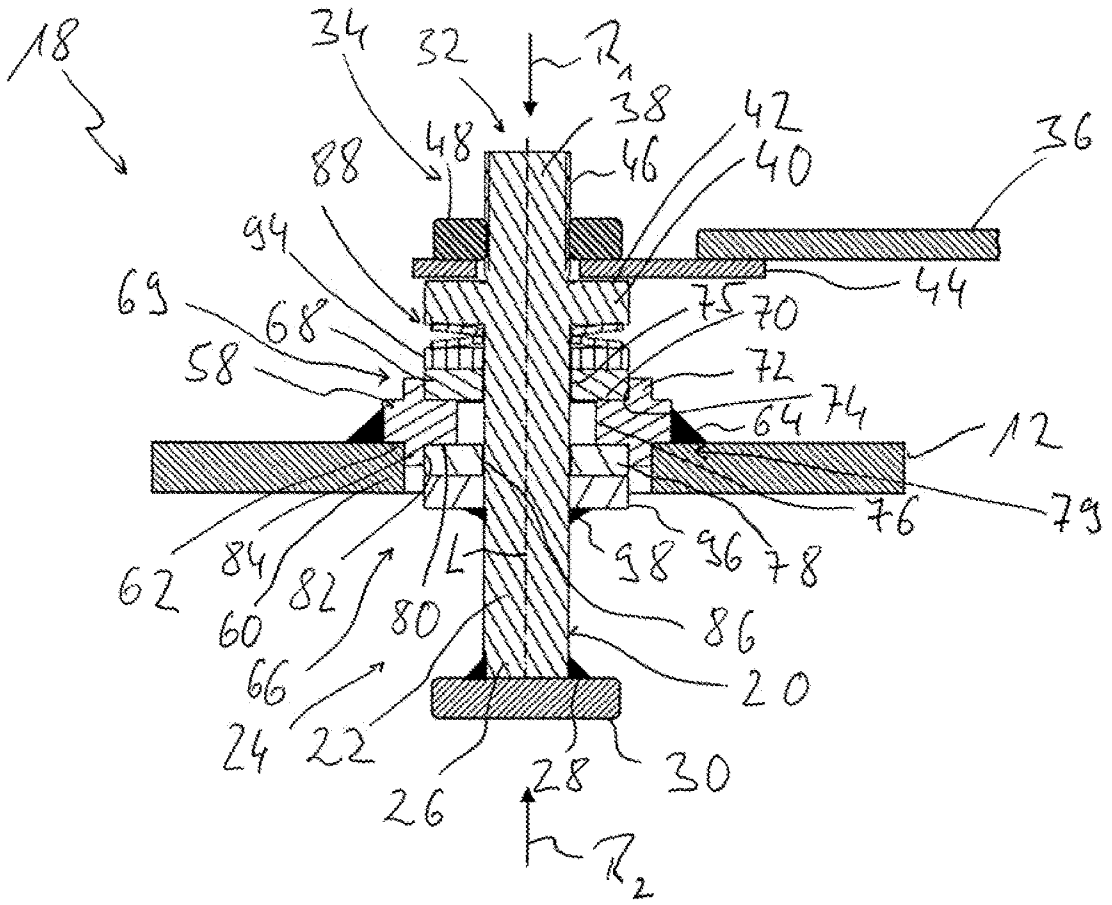
FIG. 3 shows a longitudinal sectional view of the connection unit, in section along a line III-III in FIG. 2.
Figure 4:
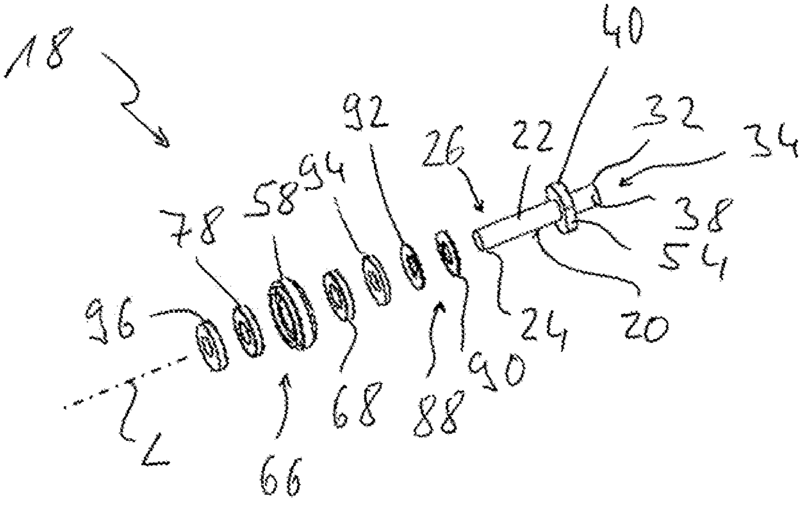
FIG. 4 shows an exploded representation of the connection unit.

For this purpose, as can be seen in FIG. 2, the radial projection 40 may include a tool engagement formation 50, which may include, for example, outer-circumference surface portions 52, 54 of an outer-circumference surface 56 of the radial projection 40 that are substantially parallel to each other at two regions of the radial projection that are diametrically opposite each other with respect to the longitudinal axis L. When the supply line 36 is being fixed to the supply-line connection region 34, the nut 48 can thus be screwed-on by use of a tool, for example a wrench or pair of pliers or the like, and the radial projection 40 can be gripped by a tool in order to prevent concomitant rotation of the connection element 20, and thus to ensure that the nut 48 can be screwed-on with a defined tightening torque.

Due to the substantially cylindrical form of the connection-element body 22, including in the region of the end portion 38, it is thus also easily possible, for the purpose of detaching, or replacing, the supply line 36, to release the supply line 36, or the cable lug 44 thereof by removing the nut 48, and then to draw it off axially from the end portion 38 without the need to overcome a clamping force. This facilitates the fitting and removal of the supply line 36, in particular in regions of a vehicle, or of the exhaust system 10, that are difficult to access. At the same time, the radial projection 40 provides a comparatively large outer surface in the manner of a cooling fin, such that the occurrence of local overheating due to the heating caused by exhaust gas flowing around the exhaust-gas heater connection region 26, or by the comparatively large electrical current flowing through the connection element 20, can be avoided.

To fix the connection unit 18 to the exhaust-system component 12, the connection unit 18 includes a carrier element 58, realized in the manner of a ring, made of metal material. Realized in the exhaust-system component 12 in association with the carrier element 58 there is an exhaust-system component opening 60, into which the carrier element 58 can be positioned with engagement. For this purpose, there may be a centering recess 62 formed on an outer circumferential region of the carrier element 58. The carrier element 58 may be fixed to the exhaust-system component 12 via a weld 64, for example a weld seam extending fully around the longitudinal axis L, such that a gas-tight seal is achieved in the region where the carrier element 58 adjoins the exhaust-system component 12.

A support unit, denoted in general by 66, is provided for holding the connection element 20 on the carrier element 58 in a defined, electrically insulated manner. The support unit 66 includes a first support element 68, in the manner of an annular disk, via which the connection element 20 is supported on the carrier element 58 in a first axial direction $R_1$. In association with the first support element 68, the carrier element 58 has, on an axial side thereof, a first support formation 69 having a first support recess 74 bounded in the first axial direction $R_1$ and radially outwardly by a first recess base 70 and a first recess wall 72. The first support element 68 is held radially centered in the first support recess 74, there being substantially no radial movement play between the first recess wall 72, which preferably extends fully in the circumferential direction around the longitudinal axis L, and the first support element 68. As a result of the first support element 68 bearing substantially flatly against the first recess base 70 and the first support element 68 adjoining the first recess wall 72 substantially without radial play, a labyrinth-type sealing interaction is provided between the carrier element 58 and the first support element 68. In addition, a temperature-resistant, for example, disk-type sealing element could be arranged, for example, between the first support element 68 and the first recess base 70.

The first support element 68 also has a first support-element opening 75 through which the connection-element body 22 of the connection element 20 is passed substantially without radial play. Thus, a defined radial positioning of the connection element 20 with respect to the carrier element 58 is predefined by the first support element 68. It is thus ensured that the connection-element body 22 passes substantially centrally through a carrier-element opening 76, realized in the carrier element 58, in such a way that there is no contact between the connection element 20 and the carrier element 58.

The support unit 66 includes a second support element 78 which is likewise realized in the manner of an annular disk. Provided in association with the second support element 78, on the other axial side of the carrier element 58 that faces toward the exhaust-system component 12, there is a second support formation 79 having a support recess 84 bounded in a second axial direction $R_2$ and radially outwardly with respect to the longitudinal axis L by a second recess base 80 and a second recess wall 82. The second support element 78, which is accommodated in the second support recess 84, is supported axially in the second axial direction $R_2$ and adjoins the second recess wall 82 radially outwardly substantially without movement play, is thus supported in a defined axial and radial position on the carrier element 58 and, with its second support-element opening 86, through which the connection-element body 22 passes substantially without movement play, ensures a further defined positioning of the connection element 20 in the carrier-element opening 76. Further, the interaction of the second support element 78 with the second support recess 84 forms a further labyrinth-type sealing formation so as to provide an even further improved gas-tight seal on the connection unit 18. A disk-type sealing element, for example, could also be arranged between the second support element 78 and the second recess base 80.

To support the connection element 20 axially in the first axial direction $R_1$ on the carrier element 58 via the first support element 68, the support unit 66 further includes a preloading unit, denoted in general by 88. In the embodiment example represented, the preloading unit 88 includes two disk springs 90, 92 arranged in mutually opposite directions. The disk spring 90 is supported with its outer circumferential region on the radial projection 40, and the disk spring 92 is supported in its outer circumferential region on the first support element 68 via an annular disk-type transmission element 94. In their radially inner regions, the two disk springs 90, 92 are supported on each other.

To support the connection element 20 axially in the second axial direction $R_2$ with respect to the carrier element 58, provided adjacent to the second support element 78 there a second annular disk-type transmission element 96, which, like the first annular disk-type transmission element 94, may be constructed with metal material. The second annular disk-type transmission element 96 is fixed to the connection-element body 22 by a weld 98, such that the two support elements 68, 78, the two disk springs 90, 92 and the first transmission element 94 are held under axial preload, between the radial projection 40 and the second transmission element 96, by the preloading action of the preloading unit 88. This preloading action also holds the two support elements 68, 78 firmly in their assigned support recesses 74, 84. The basically axially elastic fitting of the connection element 20 into the carrier element 58, resulting from the action of the preloading unit 88, prevents the occurrence of excessive stresses that could be generated, for example, by thermally induced changes in length, in particular of the connection element 20.

The structure of the connection unit 18 described above combines various particularly advantageous aspects. On the one hand, it is possible for the supply line 36 to be fixed easily and with a defined fixing torque to the supply-line connection region 34, or to be removed again from the latter without the need to overcome any frictional or clamping moments. Due to the comparatively large and constant cross-section of the connection-element body 22, it is also suitable for receiving comparatively large electrical currents, with excessive heating in the region of the connection unit 18 being avoided due to the provision of the radial projection 40 and the cooling effect that can be achieved by this, even when heated by the exhaust gas A or the electrical current conducted through the connection element 20. An overload triggered by thermally induced changes in length is avoided, since such changes in length can be compensated in the preloading unit 88, which also ensures that the two support elements 68, 78 are pressed against the carrier element 58 with substantially constant contact pressure. This also ensures a sealing interaction, between the support elements 68, 78 and the carrier element 58, that is not influenced by changes in the length of the connection element 20. At the same time, these support elements 68, 78, which are constructed with electrically insulating material, for example ceramic material such as, for example, aluminum oxide or magnesium oxide, provide sufficient electrical insulation between the connection element 20 and the carrier element 58, even in consideration of the large electrical currents.

It is understood that the foregoing description is that of the preferred embodiments of the invention and that various changes and modifications may be made thereto without departing from the spirit and scope of the invention as defined in the appended claims.

The invention claimed is:

1. A connection unit for connecting an electrical supply line to an exhaust-gas heater of an exhaust system of an internal combustion engine, the exhaust system having an exhaust-system component, the connection unit comprising:

a connection element having an electrically conductive connection-element body defining a longitudinal axis (L) and said electrically conductive connection-element body being elongated along said longitudinal axis (L);

said connection element having first and second axial end regions;

said connection element having an exhaust-gas heater connection region in said first axial end region and having a supply-line connection region in said second axial end region;

said supply-line connection region including an end portion of said connection-element body and a radial projection of said connection-element body adjoining said end portion, said radial projection forming an integral constituent part of said connection-element body;

a carrier element for fixing said connection unit to the exhaust-system component;

said carrier element defining a carrier-element opening wherethrough said connection-element body passes at a radial distance from said carrier element;

a support unit for axially and radially supporting said connection element on said carrier element;

said support unit including a first support element of electrically insulating material supported on said carrier element in a first axial direction (R1) and radially outwardly and supported with respect to said radial projection forming an integral constituent part of said connection-element body in a second axial direction (R2) opposite to said first axial direction (R1); and, said support unit further including a second support element of electrically insulating material supported on said carrier element in said second axial direction (R2) and radially outwardly.

2. The connection unit of claim 1, wherein said connection-element body is cylindrical.

3. The connection unit of claim 1, wherein said radial projection defines an outer circumferential region; and, said connection unit further comprises a tool engagement formation in said outer circumferential region of said radial projection.

4. The connection unit of claim 3, wherein said tool engagement formation comprises two mutually parallel outer-circumference surface portions of an outer circumferential surface of said radial projection.

5. The connection unit of claim 1, wherein at least one of the following applies:

i) said end portion has a cylindrical outer circumferential contour; and, ii) there is an external thread realized on said end portion.

6. The connection unit of claim 1, further comprising a first support formation for axially and radially supporting said first support element on a first axial side of said carrier element and a second support formation for axially and radially supporting said second support element on a second axial side of said carrier element.

7. The connection unit on claim 6, wherein at least one of the following applies:

i) said first support formation comprises a first support recess bounded in said first axial direction (R1) by a first recess base and bounded radially outwardly by a first recess wall; and, ii) said second support formation comprises a second support recess bounded in said second axial direction (R2) by a second recess base and bounded radially outwardly by a second recess wall.

8. The connection unit of claim 1, wherein said carrier element is constructed with metal material.

9. The connection unit of claim 1, wherein at least one of the following applies:

i) said first support element is constructed with ceramic material;

ii) said second support element is constructed with ceramic material;

iii) said connection element passes through a first support-element opening of said first support element without radial movement play; and, iv) said connection element passes through a second support-element opening of the second support element without radial movement play.

10. The connection unit of claim 1, further comprising an axially elastic preloading unit; and, said radial projection being supported in said first axial direction (R1) with respect to said first support element by said axially elastic preloading unit.

11. The connection unit of claim 10, wherein the preloading unit comprises at least one preloading spring.

12. The connection unit of claim 11, wherein said preloading spring is a disk spring.

13. The connection unit of claim 11, wherein said at least one preloading spring is supported on the first support element, in said first axial direction (R1), by a first disk-type transmission element.

14. The connection unit of claim 13, wherein said first disk-type transmission element is constructed with metal material.

15. The connection unit of claim 1, wherein the connection element is supported on said second support element, in the second axial direction (R2), by a second disk-type transmission element.

16. The connection unit of claim 15, wherein said second disk-type transmission element is constructed with metal material.

17. The connection unit of claim 15, wherein the second transmission element is fixed to the connection-element body by material bonding.

18. The connection unit of claim 17, wherein said material bonding is a weld.

19. An exhaust system for an internal combustion engine, the exhaust system comprising:

an exhaust-system component that carries exhaust gas;

at least one exhaust-gas heater arranged in the exhaust-system component;

at least one exhaust-gas treatment unit downstream of said at least one exhaust-gas heater; and, at least one connection unit being fixed to said exhaust-system component in association with said at least one exhaust-gas heater; and, said connection unit including:

a connection element having an electrically conductive connection-element body defining a longitudinal axis (L) and said electrically conductive connection-element body being elongated along said longitudinal axis (L);

said connection element having first and second axial end regions;

said connection element having an exhaust-gas heater connection region in said first axial end region and having a supply-line connection region in said second axial end region;

said supply-line connection region including an end portion of said connection-element body and a radial projection of said connection-element body adjoining said end portion, said radial projection forming an integral constituent part of said connection-element body;

a carrier element for fixing said connection unit to said exhaust-system component;

said carrier element defining a carrier-element opening wherethrough said connection-element body passes at a radial distance from said carrier element;

a support unit for axially and radially supporting said connection element on said carrier element;

said support unit including a first support element of electrically insulating material supported on said carrier element in a first axial direction (R1) and radially outwardly and supported with respect to said radial projection forming an integral constituent part of said connection-element body in a second axial direction (R2) opposite to said first axial direction (R1); and, said support unit further including a second support element of electrically insulating material supported on said carrier element in said second axial direction (R2) and radially outwardly.

* * * * *